March 31, 1936.   F. F. ROWELL   2,035,764
SILO
Filed April 22, 1935
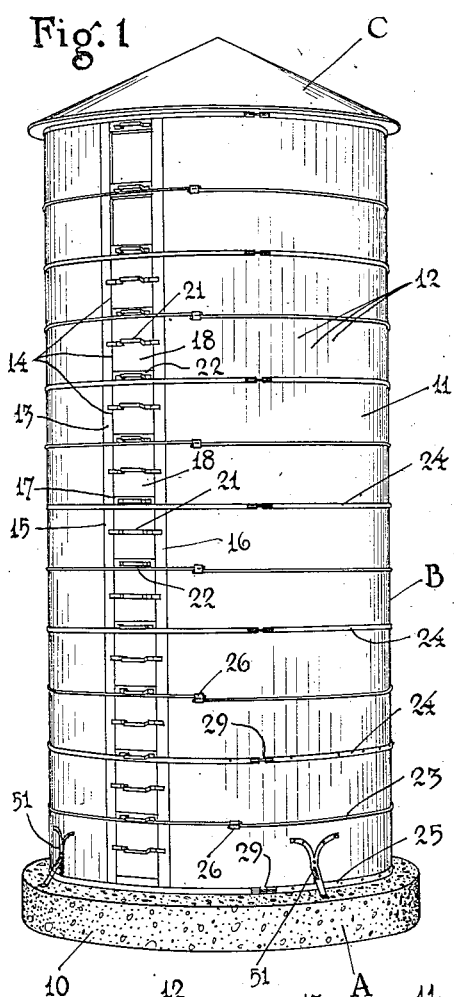
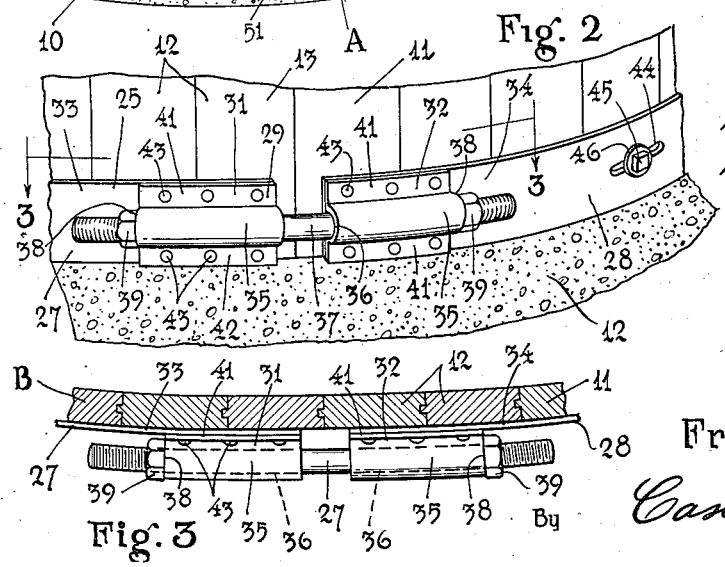
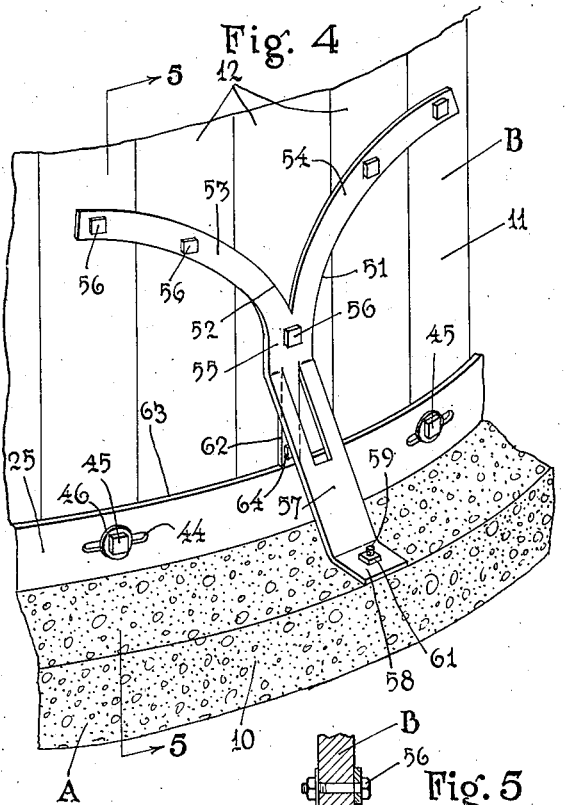
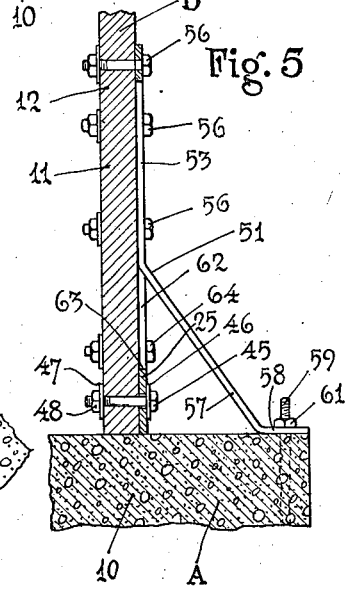
Inventor
Frank F. Rowell
By Caswell & Lagaard
Attorneys Patented Mar. 31, 1936

2,035,764

UNITED STATES PATENT OFFICE 2,035,764

SILO

Frank F. Rowell, St. Paul, Minn.

Application April 22, 1935, Serial No. 17,636

9 Claims. (Cl. 20—1.4)

My invention relates to silos and has for an object to provide a silo which will be extremely inexpensive to manufacture and install and which will be serviceable and satisfactory in use.

Another object of the invention resides in providing a silo of the vertical stave type which may be constructed of relatively thin staves such as material used for flooring and similar purposes.

An object of the invention resides in providing a silo in which the wind stresses and other stresses occasioned by forces tending to overturn the silo will be positively and effectively resisted without injury to the staves of the silo.

A still further object of the invention resides in providing one or more hoops constructed of flat strap iron arranged to overlie the staves upon the exterior thereof and in providing tensioning means in said hoops for drawing the staves together.

A feature of the invention resides in constructing the hoops with circumferentially extending slots and in providing bolts extending through the slots and staves for resisting buckling of the staves and for resisting longitudinal movement of the hoops relative to the staves.

Another feature of the invention resides in constructing the hoops in sections with separate tensioning devices between the various sections for the purpose of reducing travel of the bolts along the slots in the tightening of the sections.

An object of the invention resides in utilizing a hoop at the lowermost ends of the staves and in employing an anchor secured to the staves and having a part engaging said hoop whereby stresses resulting from forces tending to produce overturning of the silo are partly transmitted from the staves through the hoop and to the anchor.

A feature of the invention resides in constructing said lowermost hoop from flat strap iron and in securing the same to the staves of the silo through bolts extending through slots in said hoop.

A still further object of the invention resides in constructing the anchor with a plurality of reaches secured to the various staves of the silo, one of said reaches engaging the hoop and in providing the anchor with a leg extending outwardly therefrom for anchorage to the ground.

A feature of the invention resides in constructing the anchor from a single plate of material slit at one end to form two of the reaches and provided intermediate its length with a third reach struck out from the material of the same.

Other objects of the invention reside in the novel combination and arrangement of parts and in the details of construction hereinafter illustrated and/or described.

In the drawing:

Fig. 1 is a perspective view of a silo illustrating an embodiment of my invention.

Fig. 2 is a fragmentary perspective view of a portion of the silo shown in Fig. 1 and illustrating the tensioning device used in conjunction with the hoops thereof.

Fig. 3 is a plan sectional view taken on line 3—3 of Fig. 2.

Fig. 4 is a perspective view of a portion of the silo showing my improved anchor used in conjunction therewith.

Fig. 5 is an elevational sectional view taken on line 5—5 of Fig. 4.

In the construction of wood stave silos it has heretofore been the practice to use a relatively heavy lumber usually over an inch thick and specially matched to form a circle when erected. The present invention provides a construction in which a much thinner lumber may be used of a thickness less than an inch such as ordinary flooring or similar dressed and matched lumber.

The silo illustrated comprises a foundation A, a wall structure B and a roof C covering the silo proper. These parts will now be described in detail.

The construction of the foundation A forms no particular feature of the invention and any type of foundation may be used. The foundation A illustrated consists merely of a slab 10 constructed of concrete or masonry of a depth sufficient to withstand the load placed upon the same. Due to the fact that the silo proper is exceedingly light in weight, almost any sort of a foundation will be suitable. If, however, it be desired, the foundation A may be constructed as a wall which is carried below the frost line to prevent distortion of the silo through frost and in such cases the wall forming the foundation may be used with or without a floor as found desirable.

The wall structure B comprises planking 11 which consists of vertical staves 12 constructed of dressed and matched lumber such as flooring or similar lumber. Due to the particular construction of the silo and the features of the invention employed, an extremely thin lumber may be used, such as $\frac{13}{16}$ inch flooring or similar matched and dressed lumber. Ordinary flooring is constructed with the lower shoulder abutting the tongue cut back from the upper shoulder so that when the same is laid as flooring, tight joints will result. With the diameters of silos ordinarily used, such construction of the matching allows the staves to be laid in circles without gaps in the joints.

In the wall structure B of the silo is disposed a vertically extending door frame 13 formed with regularly arranged openings 14 positioned one above the other. The door frame 13 is constructed with uprights 15 and 16 and with cross frame members 17 secured thereto and by means of which the openings 14 are formed. A number of doors 18 applicable to the door frame 13 from within the interior of the silo serve to close the openings 14. These doors may be rabbeted into the door frame 13, thereby forming a tight joint. To gain access to any of the openings 14 a ladder is employed which consists of rungs 21 and 22 spaced the proper distances apart. The rungs 22 are attached to the cross members 17 while the rungs 21 are attached to the doors 18. Any suitable latch device may be used for holding the doors in position and such construction forming no particular feature of the invention, has not been illustrated.

The staves 12 of the silo butt up against the uprights 15 and 16 of the frame 13 and are held in position by means of a number of hoops 23 and 24, the lowermost of which hoops is designated by the reference numeral 25. The hoops 25 and 24 are constructed of flat strap iron and form one of the features of the invention which will presently be described in detail. The hoops 23 are disposed intermediate the hoops 24 and are preferably round rods threaded at their ends and secured to ordinary lugs or connections 26. If desired, all of the hoops may be constructed the same as the hoops 24 and 25 instead of using alternate round rods as illustrated. All of the hoops 24 and 25 being identical in construction, only the hoop 25 will be described in detail.

The hoop 25 is best shown in Figs. 2 and 3. This hoop is constructed with a number of separate sections 27 and 28 which are identical in construction. Between the various sections are provided tensioning devices 29, all of which are identical. The tensioning device 29 shown in Fig. 2 consists of two lugs 31 and 32 which are attached to the ends 33 and 34 of the hoop sections 27 and 28. These lugs are formed from plates of metal which are bent medially of the lateral edges thereof to form outstanding portions 35 which are offset from or spaced from the respective hoop sections to which they are attached and which provide curved circumferentially extending channels 36 through the same. The portions 35 serve as eyes through which a suitable tie rod 27 may extend and the channels 36 form the openings through the eyes. The extreme ends of the eyes 35 have shoulders 38 against which nuts 39 screwed upon the ends of the tie rod 37 may abut. When the nuts 39 are turned, the various sections of the hoops are drawn together and the matching of the staves of the silo closed. The lugs 31 and 32 are further constructed with flanges 41 and 42 which issue laterally from the eyes 35 and which are riveted to the ends 33 and 34 of the hoop sections 27 and 28 by means of rivets 43.

For the purpose of holding the hoops 25 and 24 from longitudinal movement and to prevent buckling of the staves in the tensioning of these hoops the said hoops are constructed with circumferentially extending slots 44. Bolts 45 extend through these slots and through the various staves 12 of the silo lying opposite the same. Adjacent the hoops 25 and 24 and upon the interior of the silo are provided washers 46 and 47 which encircle the bolts 45. Nuts 48 screwed upon the ends of these bolts engage the washers 47 and draw the staves against the hoop. By means of these bolts buckling of the staves is prevented and also longitudinal movement of the hoops relative to the staves is prevented.

For the purpose of anchoring the silo to the ground, a number of anchors 51 are employed which are identical in construction. Only one of these anchors, namely the one shown in Fig. 4, will be described in detail. This anchor is constructed from a plate or band of metal which is slit medially of its length at one end as indicated at 52 to provide two reaches 53 and 54 extending outwardly from the central portion of the bar which constitutes the body thereof and is indicated by the reference numeral 55. These reaches are preferably bent outwardly in diverging relation, as shown in Fig. 4 and are provided with bolt holes through which pass bolts 56 having the same purpose as the bolts 45 previously referred to. The body 55 of the anchor has bent outwardly therefrom an inclined leg 57 which is formed at its lower end with a foot 58. This foot rests upon the foundation A and has extending through it a stud bolt 59 set into the concrete of the foundation when the same is being erected. This bolt has screwed upon it a nut 61 which serves to clamp the anchor to the foundation. From the center of the leg 57 is struck out a tongue 62 which lies in the plane of the reaches 53 and 54 and constitutes another reach lying adjacent the staves of the silo. This reach is adapted to engage the upper edge 63 of the hoop 25 and restrains movement between the hoop and anchor. This leg may also be bolted to the stave of the silo which comes opposite to it by means of a bolt 64.

When the anchor is properly positioned and attached, any stresses imparted to the silo through wind or any other force tending to overturn the silo is transmitted through the bolts 45 and to the hoop 25. The said hoop transmits the stresses to the reach 62 of anchor 51, and the said anchor transmits it to the stud bolt 59 which is imbedded in the concrete foundation A. By means of this particular construction, the stress upon the staves is not transmitted from one stave to the other and from a limited number of staves to the anchor as would be the case in the event the leg 62 of the anchor were entirely missing, but is transmitted from the staves to the lowermost hoop and from this hoop to the anchor. This relieves the strain on the individual staves to which the anchor is attached and prevents injury to the silo.

In the event that the stud bolts 59 are not accurately placed, the legs 57 of the anchors may be bent to accommodate the conditions arising. Where the reaches 62 extend below the upper edge 63 of the hoop 25, washers or other filler members may be placed under the feet 58 of the anchors. Where the same extend above the upper edge of the hoop the same are not brought into action until actual contact between the ends of the said reaches and the hoop actually occurs. When this occurs the same results are produced as would be the case where the said reaches originally engaged the upper edges of the lowermost hoop. In some cases, sliding of the staves relative to one another might occur until reach 62 engages the hoop. Thereafter the stresses would be uniformly distributed throughout the staves and transmitted to the anchor through the lowermost hoop.

The roof C may be constructed of any suitable construction, such as is now in common use for the purpose of enclosing the wall structure of the silo. Inasmuch as the construction of the roof forms no particular feature of the invention, the same has not been shown in detail in this application.

In the construction of a silo in accordance with my invention, the procedure is as follows: The foundation A is first cast in concrete in the usual manner and the stud bolts 59 imbedded in the concrete at the desired localities. The number of anchors employed depends upon the size of the silo and since the same may be applied to the silo wall structure at any locality, the number of anchors used can be increased or decreased to meet the requirements. After the foundation has been erected, the frame 15 is next erected and held in position by means of proper bracing. The staves are then erected and the lowermost hoops applied thereto. The erection of the staves then continues and the upper hoops are applied one at a time until the entire silo has been erected. The various tensioning devices utilized with the hoops are now tightened until sufficient tension is produced in the hoops to close the joints of the staves and to form an air tight construction. Before the tensioning devices of the hoops are tightened, the bolts 45 are applied and are positioned intermediate the ends of the slots 44 so as to permit of adjustment of the hoop in either direction. After the wall structure 11 has been completed the anchors 51 are applied which are placed so that the holes in the feet 58 thereof receive the studs 59. The legs 57 are then bent if necessary so that the reaches 53, 54 and 62 engage the staves of the silo. Ordinarily, the reaches 62 engage surface 63 of the lowermost hoop 25 and when this is the case, the bolts 55, 56, 57 and 64 are applied and the anchors become securely attached to the staves of the silo. If the feet 58 rest upon the concrete foundation A, nuts 61 may be applied. If when the reaches 62 engage the edge 63 of hoop 57, feet 58 are above the foundation, suitable washers may be placed between said feet and foundation and the anchor attached as previously described. In the event that one of the reaches 62 comes above the edge 63 of the hoop 25, a suitable filler, not shown, may be placed in between said reach and hoop or the same may be left open. In the latter case, hoop 25 does not come into action until the said parts of the hoop and anchor engage one another, which in most cases occurs before any great damage will have been done to the silo through the stresses set up in the same. After the anchors are in place and the silo wall structure complete, the roof C, if a roof is desired, is applied and the silo is then ready for use.

My invention is highly advantageous in that an extremely simple and practical construction is provided, whereby a silo may be quickly and easily erected at a minimum cost. By means of my improved construction, a relatively thin lumber may be used as planking for the silo wall, thereby greatly reducing the cost. At the same time a construction is provided which may be moved about as the occasion demands, making the silo portable. My improved silo when properly erected remains permanently in position and is fully capable of resisting wind stresses. By means of the type of hoop construction used and the anchors cooperating therewith, the stresses set up in the staves of the silo by wind or otherwise are transmitted through the lowermost hoop to the anchors and thereby distribution of stresses occurs which is highly effective in resisting the forces exerted against the silo wall structure by wind or otherwise. Silos may be constructed in accordance with my invention of any desired dimensions. In the erection of the silo, no great amount of accuracy is required in locating the anchor bolts, since the anchors may be adjusted to the same.

Changes in the specific form of my invention, as herein disclosed, may be made within the scope of what is claimed without departing from the spirit of my invention.

Having described my invention, what I claim as new and desire to protect by Letters Patent is:

I claim:—

1. In a vertical stave silo, a hoop encircling the staves and holding the same together, fastening means for restraining longitudinal movement of the hoops relative to the staves and an anchor attached to the silo staves independently of the hoop and having a part engaging said hoop, said part transmitting stresses arising in overturning from the staves through said hoop and to the anchor.

2. In a vertical stave silo, a hoop encircling the staves and holding the same together, said hoop being disposed at the lowermost end of the silo, fastening means for restraining longitudinal movement of the hoop relative to the staves, an anchor having a part attached to the staves at a locality above the hoop, another part issuing from said first named part and engaging the upper surface of the hoop and having still another part for anchorage to the ground.

3. An anchor for vertical stave silos comprising a body portion, two diverging reaches extending therefrom for attachment to the staves of the silo, an inclined leg extending from said body portion for anchorage to the ground and a vertical reach extending from said body portion and engaging a hoop of the silo.

4. An anchor for vertical stave silos comprising three reaches arranged in the form of a Y and adapted to overlie the exterior of the silo, and a leg issuing angularly from said reaches at the locality of the crotch of the Y.

5. In a vertical stave silo, a hoop formed from flat strap iron and constructed in sections, lugs secured to the adjoining ends of the sections, said lugs being formed from plates having circumferentially extending offset portions at the centers thereof spaced from the sections of the hoop to provide aligning channels therebetween, said offset portions providing oppositely facing shoulders, said lugs further having flanges issuing from said offset portions and secured to the ends of said hoop sections, and tie rods extending through said channels and having members thereon engaging said shoulders, one of said members of each of said tie rods being threaded to cause the sections of the hoop to draw together upon rotation thereof.

6. In a vertical stave silo, a hoop formed from flat strap iron and constructed in sections, lugs secured to the adjoining ends of the sections, said lugs being formed from plates, said plates being bent in a circumferential direction to provide portions spaced from the hoop and forming circular channels between the hoop and bent portions and serving as eyes having oppositely facing shoulders, said lugs being further formed with flanges issuing from the bent portions and adapted to engage the hoop, means for securing the flanges to the ends of the hoops, tie rods extending through said channels and nuts screwed upon the ends of the tie rods and engaging said shoulders.

7. An anchor for vertical stave silos constructed from an elongated plate, said plate being slit along its upper end and the portions separated by the slot spread apart to form diverging reaches, said anchor having the lower portion bent outwardly therefrom to form a leg and a tongue struck out of the leg of said anchor and forming another reach lying in the plane of said first named reaches.

8. In a vertical stave silo, a hoop encircling the staves and holding the same together, said hoop being disposed at the lowermost end of the silo, fastening means for restraining longitudinal movement of the hoop relative to the staves, an anchor attached to the staves above the hoop and engaging the hoop, and means formed on said anchor for anchorage to the ground.

9. An anchor for vertical stave silos comprising a body portion having three diverging reaches for engagement with the staves of a silo, and a leg extending outwardly from said body at an angle to the wall of the silo for anchorage to the ground.

FRANK F. ROWELL.